(12) United States Patent
Zuk et al.

(10) Patent No.: US 9,696,426 B2
(45) Date of Patent: Jul. 4, 2017

(54) SYSTEM AND METHOD FOR SCAN RANGE GATING

(71) Applicant: Michigan Aerospace Corporation, Ann Arbor, MI (US)

(72) Inventors: David M. Zuk, Ann Arbor, MI (US); Scott Lindemann, Ann arbor, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 390 days.

(21) Appl. No.: 14/397,950

(22) PCT Filed: Mar. 18, 2013

(86) PCT No.: PCT/US2013/032857
§ 371 (c)(1),
(2) Date: Oct. 30, 2014

(87) PCT Pub. No.: WO2014/011241
PCT Pub. Date: Jan. 16, 2014

(65) Prior Publication Data
US 2015/0116692 A1    Apr. 30, 2015

Related U.S. Application Data

(60) Provisional application No. 61/640,101, filed on Apr. 30, 2012.

(51) Int. Cl.
*G01C 3/08* (2006.01)
*G01S 17/10* (2006.01)
(Continued)

(52) U.S. Cl.
CPC .......... *G01S 17/107* (2013.01); *G01S 7/4817* (2013.01); *G01S 7/4818* (2013.01); *G01S 17/95* (2013.01)

(58) Field of Classification Search
CPC ...... G01S 7/4817; G01S 7/4818; G01S 17/95; G01S 17/107
(Continued)

(56) References Cited

U.S. PATENT DOCUMENTS 4,195,931 A * 4/1980 Hara .................. G01J 3/26
356/454
4,429,994 A * 2/1984 Guagliardo .............. G01H 5/00
340/850

(Continued)

OTHER PUBLICATIONS

International Search Report and Written Opinion in corresponding PCT application PCT/US13/032857 dated Jan. 24, 2014, 11 pp.

*Primary Examiner* — Mark Hellner
(74) *Attorney, Agent, or Firm* — Juan Carlos A. Marquez; Marquez IP Law Office, PLLC (57) ABSTRACT

A system for scanning light to define a range gated signal includes a pulsed coherent light source that directs light into the atmosphere, a light gathering instrument that receives the light modified by atmospheric backscatter and transfers the light onto an image plane, a scanner that scans collimated light from the image plane to form a range gated signal from the light modified by atmospheric backscatter, a control circuit that coordinates timing of a scan rate of the scanner and a pulse rate of the pulsed coherent light source so that the range gated signal is formed according to a desired range gate, an optical device onto which an image of the range gated signal is scanned, and an interferometer to which the image of the range gated signal is directed by the optical device. The interferometer is configured to modify the image according to a desired analysis.

38 Claims, 8 Drawing Sheets

(51) Int. Cl.
*G01S 17/95* (2006.01)
*G01S 7/481* (2006.01)

(58) Field of Classification Search
USPC ........................................................ 356/4.01
See application file for complete search history.

(56) References Cited

U.S. PATENT DOCUMENTS

| | | |
|---|---|---|
| 5,940,170 A | 8/1999 | Berg et al. |
| 7,315,377 B2 | 1/2008 | Holland et al. |
| 7,787,131 B1 * | 8/2010 | Moran ............... G01B 11/2441 356/5.03 |
| 2004/0151436 A1 | 8/2004 | Chan |
| 2011/0164783 A1 | 7/2011 | Hays et al. |
| 2012/0050750 A1 | 3/2012 | Hayes et al. |

* cited by examiner

SYSTEM AND METHOD FOR SCAN RANGE GATING

CLAIM OF PRIORITY

This application claims the benefit of U.S. Provisional Application No. 61/640,101, filed on Apr. 30, 2012; and is the US National Stage of PCT Application No. PCT/US2013/032857, filed Mar. 18, 2013. The disclosures of both the above-referenced applications are incorporated herein by reference.

The invention that is the subject of this application was developed under a Phase I SBIR contract with the National Aeronautic and Space Administration (NASA), Contract No. NNX11CD62P. The U.S. Government may have rights in the invention.

BACKGROUND OF THE INVENTION

1. Field of the Invention

Exemplary embodiments of the present invention are related to range gating within a Light Detection and Ranging (LIDAR) system. More particularly, exemplary embodiments are related to the LIDAR systems in which timing of a pulsed laser beam and a scanner is coordinated to define a range gated signal according to a desired range gate for performing measurement of atmospheric data products.

2. Summary of the Prior Art

U.S. Pat. No. 7,315,377 to Holland et al. discloses a system for remote sensing and analyzing spectral properties of a target or chemical. Holland uses a scanner to illuminate different detectors, which are not scanning to perform any range gating. This system is passive, and its scan views all ranges within the field of view simultaneously.

U.S. Pat. No. 5,231,401 to Kaman et al. discloses an imaging system for forming an image of an object with a scanning mirror and a multiple camera assembly. Kaman uses an object plane scanner with a gated detector. An intensified charge-coupled device (CCD) is used to provide the necessary range gating. The moving mirrors are used to scan the sensor's field of regard and not range gate.

U.S. Pat. No. 5,831,719 to Berg et al. discloses a laser scanner for measuring spatial properties of objects. Berg employs an object plane scanner.

U.S. Pat. No. 7,534,984 to Gleckler shows an electronic means to scan the beam, using a rotating polygon mirror and a Micro-Electro-Mechanical System (MEMS) mirror as methods of implementing a streaking camera.

U.S. Pat. No. 5,006,721 to Cameron et al. discloses a LIDAR scanner incorporating a polygonal mirror. Cameron describes an object plane scanner that scans the field of view of the transmitted laser beam and the field of view of the receive telescope across the scene.

The output of a Fabry-Perot interferometer is an image that is modified by the atmospheric data products identified above. In the LIDAR system, a detector converts the backscattered light in the form of an image to an electrical signal that is processed to produce the atmospheric data products. These LIDAR systems make measurements in a single range bin defined by the overlap of the transmitted laser beam and the receiver FOV.

In some cases, it is desirable to make measurements at different ranges simultaneously. For example, one may wish to make measurements in a 20 meter long volume of air at ranges of 150 and 250 meters from the LIDAR system. The 20 meter long volume is often referred to as a range bin. Two methods for implementing measurements of rang bins at different ranges have been disclosed previously.

In one method that has been published as patent application WO 2011/016892A2, the parallax between the transmitted beam and the received beam allows for atmospheric data product measurements to be simultaneously made at different ranges with different range bins. The imaging characteristic of this design allows one to use CCD or similar detectors which are advantageous in that they allow one to make simultaneous measurements at different ranges. The CCD or similar detector allows one to integrate multiple pulses into a single measurement to improve the measurement precision. This technique may also be used with a continuous wave laser. There is however a limitation in that the separation between the source and receiver can become quite large if range bins on the order of 20 meters at ranges of 100's of meters is desired.

A second method that one may use for obtaining range binned atmospheric data product measurements has been described in patent application WO 2010/124038A2, where a micro-mirror device is used to segment the Fabry-Perot image into independent patterns that enable one to use a higher bandwidth detector such as a photo multiplier tube (PMT). In this case, the range bins are defined by how long the signal from the PMT is integrated, and time of flight is used to establish the range from the sensor. For each of the atmospheric data products, one or more segmentations are required to produce independent segmented images for computation of each of the atmospheric data products.

Figure 1:
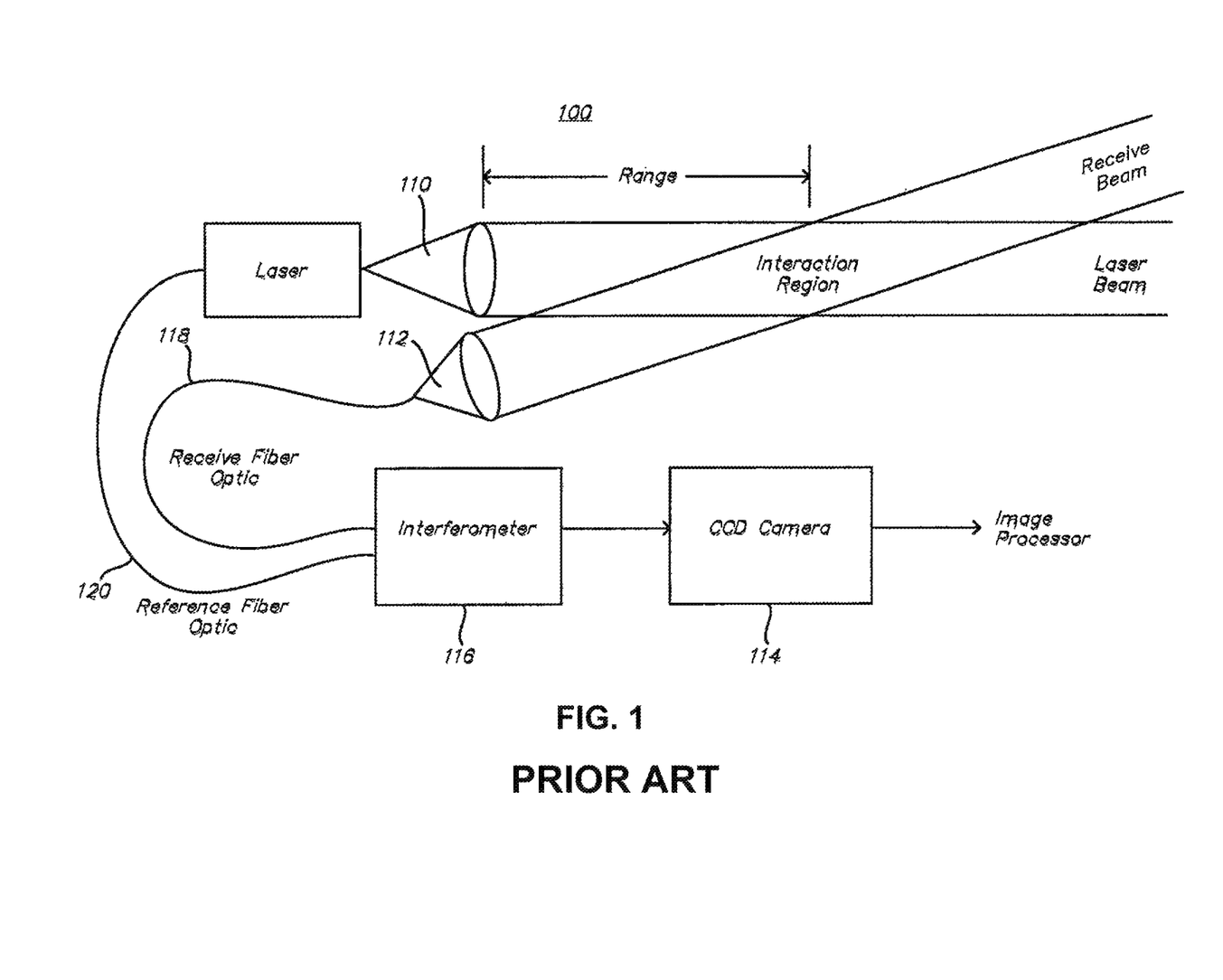
FIG. 1 shows a simplified block diagram of a standard LIDAR system.

As shown in FIG. 1, a simplified block diagram of a standard LIDAR system 100 is illustrated. While the transmitted beam 110 and the receive telescope field-of-view (FOV) 112 are shown in a configuration where transmit and receive optical axes are offset, there are cases where the transmit and receive optical axes could be common.

In the case shown, the CCD camera 114 will observe the entire interaction region during a CCD frame time. In practice the CCD exposure may integrate many laser pulses to obtain a signal strong enough to make the atmospheric data product measurements. As mentioned above, there are instances where one would like to make measurements over pre-determined range intervals or range bins at different ranges from the sensor. In effect, one would like to place a "shutter" in the path of the Receive Fiber Optic 118 to "range gate" the atmospheric backscatter observed.

For example, Q-switched lasers that are often used in LIDARs have laser pulses that are on the order of 10 to 20 ns in duration which translates to an out and back range of 1.5 to 3 meters. The pulse width puts a limit on the minimum range bin size. However, in the measurement of atmospheric data products, a range bin on the order of 20 to 50 meters is more appropriate. A range bin of 20 to 50 meters corresponds to integration times of 133 to 333 ns. Since most shutters have aperture times on the order of milliseconds they are not adequate for the task at hand.

SUMMARY OF THE INVENTION

The shortcomings of the prior art can be overcome and additional advantages can be provided through exemplary embodiments of the present invention that are related to a system for scanning light to define a range gated signal. The system includes a pulsed coherent light source that directs light into the atmosphere, a light gathering instrument that receives the light modified by atmospheric backscatter and transfers the light onto an image plane, a scanner that scans collimated light formed by collimating the light from the image plane to form a range gated signal from the light modified by atmospheric backscatter received by light gathering instrument, a control circuit that coordinates timing of a scan rate of the scanner and a pulse rate of the pulsed coherent light source so that the range gated signal is formed according to a desired range gate, an optical device onto which an image of the range gated signal is scanned, and an interferometer to which the image of the range gated signal is directed by the optical device. The interferometer is configured to modify the image of the range gated signal according to a desired analysis to produce a modified image of the range gated signal.

Exemplary embodiments of the present invention are also related to a method for scanning light to define a range gated signal that includes directing light from a pulsed coherent light source into the atmosphere, receiving the light modified by atmospheric backscatter, transferring the light modified by atmospheric backscatter onto an image plane, collimating the light from the image plane to form collimated light, scanning the collimated light to form a range gated signal from the light modified by atmospheric backscatter that is received, coordinating timing of a scan rate of scanning the collimated light and a pulse rate of the pulsed coherent light source so that the range gated signal is formed according to a desired range gate, scanning an image of the range gated signal onto an optical device that directs the image of the range gated signal to an interferometer, and modifying the image of the range gated signal at the interferometer according to a desired analysis to produce a modified image of the range gated signal.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. Any flow diagrams and the like depicted herein are just examples. There may be many variations to these diagrams or steps (or operations) described therein without departing from the spirit of the invention. For instance, steps may be performed in a differing order, or steps may be added, deleted, or modified. All of these variations are considered a part of the claimed invention.

DETAILED DESCRIPTION OF THE INVENTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. For purposes of clarity, the same reference numbers will be used in the drawings to identify similar elements. Further, the terms and phrases used herein are not intended to be limiting but rather to provide an understandable description of the invention.

Exemplary embodiments of the present invention may be implemented to provide for range gating in a LIDAR system that has a low bandwidth detector. In exemplary embodiments, the LIDAR system is a direct detection system that employs a Fabry-Perot etalon in the measurement of at least one and potentially all of the following atmospheric data products; velocity, temperature, aerosol to molecular ratio, and atmospheric density. Measurements are made in the volume where the receive telescope field-of-view (FOV), and the transmitted laser beam overlap. The transmitted laser beam is modified by the atmospheric backscatter. The LIDAR system measures the backscattered laser beam and converts the backscatter measurements to the atmospheric data products. A Fabry-Perot LIDAR system and how the atmospheric data products may be obtained are covered in U.S. Pat. Nos. 7,106,447; 7,495,774; 7,505,145; 7,508,528; 7,518,736 and 7,522,291, all of which are hereby incorporated by reference.

Figure 2:
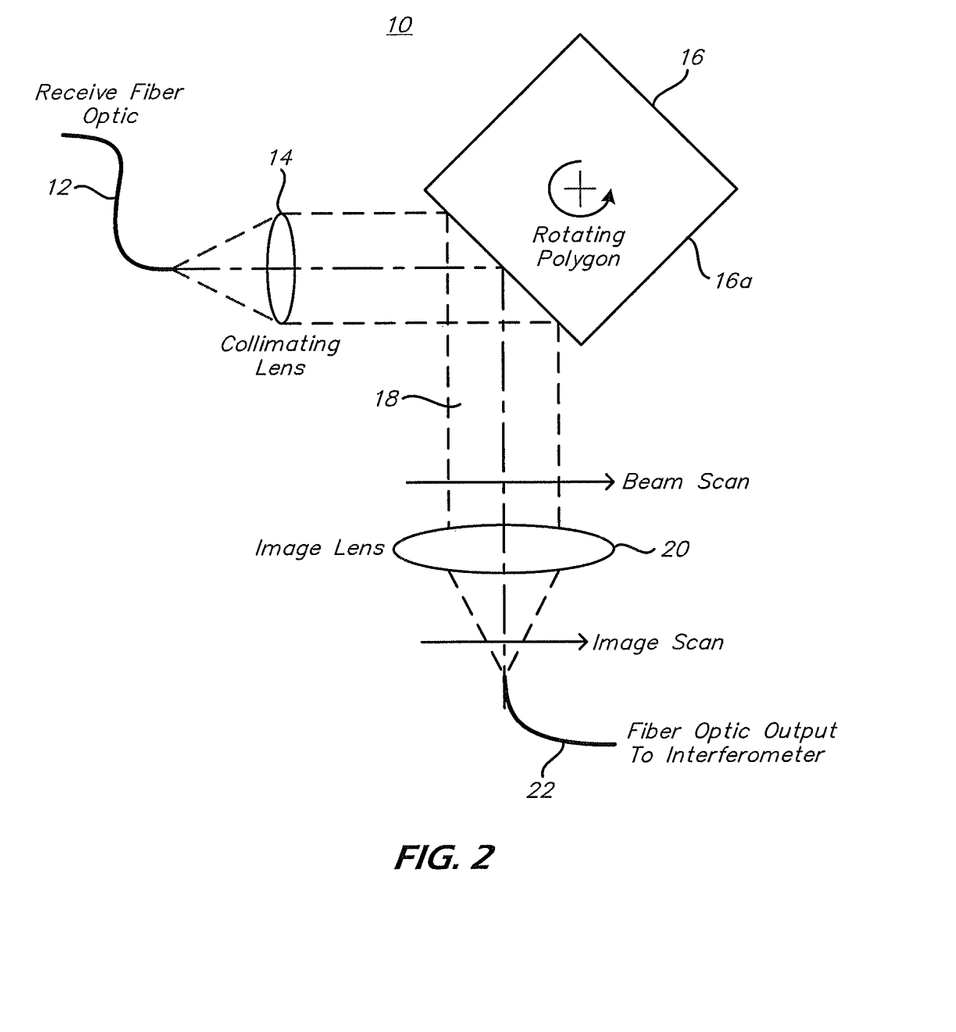
FIG. 2 is a schematic diagram illustrating a range gating system configuration according to a first embodiment of the present invention.

The scan range gating implemented in exemplary embodiments solves the gating issue by placing a rotating mirror in the Receiver Fiber Optic path. FIG. 2 illustrates a gating system 10 according to a first embodiment of the invention, and in particular an implementation for the range gate by connecting the components shown to the Receive Fiber Optic 12 illustrated in FIG. 1. The Receive Fiber Optic 12 would receive the light from the receive telescope (not shown). The light from the fiber would be effectively collimated via collimator lens 14 and reflected from a spinning polygon mirror 16. Alternatively, an oscillating mirror would also be used. The reflected beam 18 will be scanned across the imaging lens 20 where the lens will generate an image of the input fiber 12 that is scanned across the output fiber 22. The amount of time it takes for the image to be scanned across the output fiber 22 determines the range gate time. By spinning the polygon mirror 18 at a high rate of speed and moving the imaging lens 20 further from the polygon mirror 18, range gated light on the order of 100 to 400 or more ns can be obtained.

For achieving the range gating, the timing between the rotation of the polygon mirror 16 and the laser pulses must be coordinated. The degree of coordination will depend upon the "range jitter" allowed in the measurement. As long as the laser pulse interval has low jitter, it is straight forward to develop a control loop that will synchronize the laser pulses and the polygon rotation angle. Range jitter, as described herein, refers to the variation in dwell time resulting from clock jitter, laser pulse jitter, and uncorrected errors in the polygon facet angles. Clock jitter refers to the phase noise present on the timing signal from any oscillator. This jitter is often very small and usually may be ignored when compared to the other factors. Laser pulse jitter is the variation that one observes between the command to the Q-switch and the actual laser pulse. There will always be some variation in the angles from facet to facet. This difference in angle from facet to facet results in a slight shift in the dwell time for each facet. While the facet to facet error is deterministic, and may be corrected for by changing the Q-switch timing to compensate for each facet; the correction will be quantized to the interval defined by the highest clock frequency available in the system.

Figure 3:
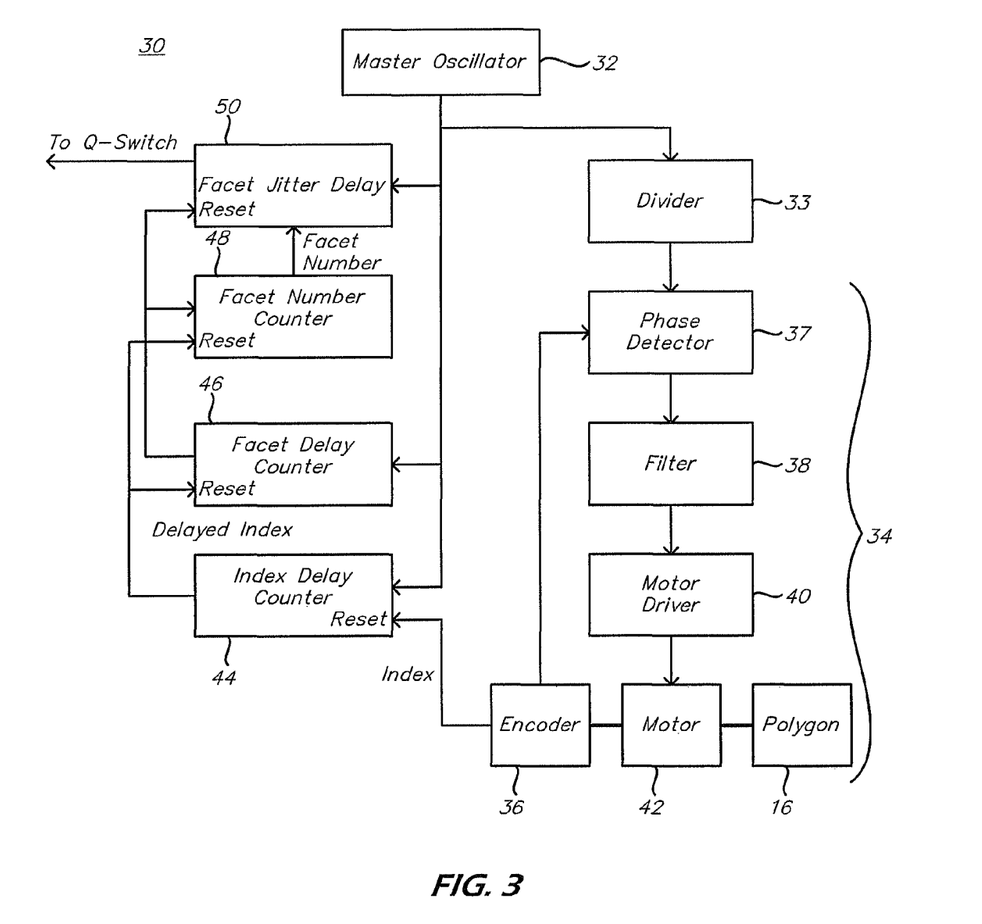
FIG. 3 is a block diagram illustrating an example system for coordinating laser pulses and polygon rotation in the first embodiment depicted in FIG. 2.

One embodiment for coordinating the laser pulses and the polygon rotation is based on a motor speed control circuit 30 having a master clock (oscillator) 32, a divider 33, and a phase locked control loop 34 as shown in FIG. 3. A high frequency oscillator operating in the range of, for example, 200 MHz would be used as the master clock 32. By directly dividing the master clock signal, or using the phase locked loop 34, other clocks that are phase locked to each other may be generated.

Precise motor speed control may be obtained by (for example) mounting an incremental Encoder 36 to detect an index mark (not shown) on the shaft (not shown) of the polygon mirror 16. The incremental output of the Encoder 36 will produce pulses that vary according to the rotation rate of the Polygon 16. The index mark provides a pulse that one may use to determine the precise location of the individual polygon facets 16*a*.

FIG. 3 also illustrates the motor speed control circuit 30 with the functions needed to generate a Q-Switch pulse with a variable delay for each facet. By knowing the number of incremental pulses per revolution, the desired rotation rate, and the number of polygon facets, the divider 33 can be configured to produce the same number of pulses as the encoder 36 should when at speed. The Phase Detector 36 outputs a signal that is proportional to the phase difference between the signal from the Divider 33 and the signal from the encoder 36. That phase difference or phase error signal passed through the filter 38 and sent to the Motor Driver 40 where the Motor 42 is commanded to speed up or slow down to obtain a phase lock between the signal from the Divider 33 and the Encoder 36.

The signal to command the laser's Q-switch (not shown) is generated from the counters on the left of the figure. The bottom box is the Index Delay Counter 44. The purpose of this counter is to generate a time delayed index pulse that is used to reset the Facet Number Counter 46 and Facet Delay Counter 46. The Index Delay Counter 44 allows one to compensate for differences between the facet "zero" and the index mark on the shaft of the polygon mirror 16. The index mark does not have to be physically aligned with any mirror facet 16*a* as the index can be electronically delayed more precisely than one could physically align the index mark to a facet.

The delayed index is used to reset the Facet Delay Counter 56 and Facet Number Counter 55. The Facet Delay Counter 46 outputs a pulse for each facet. The count is established by the number of master clock cycles encountered when going from one facet to the next. The Facet Number Counter 48 identifies the particular facet, so that the correct Facet Jitter Delay 50 may be used to fire the Q-switch that sends the pulse from the laser.

The optimum scan rate depends upon the system parameters desire and may consider various factors including cost as well as performance. As an example, for a range bin of 50 meters for a particular application, an exposure or gate time of approximately 333 ns would be optimal.

The technique is not limited to a single range gate or a single time. By changing the diameter of the output fiber optic, the amount of time the fiber transmits light is increased and the range gate would be increased. Similarly by making the fiber smaller, the range gate time would be decreased. Further, by adding additional fibers in the direction of the scanned image, multiple ranges may be measured over the same integration time.

It should be noted that changing the fiber optic diameter does not necessarily increase or decrease the light transmission and or the range gating as the fiber diameter is only one factor in determining how much light is coupled. The Imaging and Collimating Lens characteristics must be addressed. For example, referring to FIGS. 2 and 3, if the Collimating Lens 14 and its fiber diameter matched the Imaging Lens 20 and its fiber diameter, then the image of the input fiber 12 would match the diameter of the output fiber 22, and when the alignment was proper, all the light would be coupled into the output fiber 22. Increasing the output fiber diameter would increase the angles over which the maximum coupling would occur, and hence increase the range gate.

However, if the Imaging Lens 20 had twice the focal length of the Collimating Lens 14, then the output optical fiber 22 would need to be twice as large to collect all the light from the input fiber 12 as the image size would be doubled. Proper design including an analysis of etendue would insure that potential light losses were addressed and determine the range bin.

Each fiber would be arranged so that the illumination from the fiber would be imaged onto a separate region on the interferometer (not shown). Each region is a separate image generated by light with the range bin at each range. By analyzing the fringes in each image, atmospheric data products for each range bin may be extracted, using for example the techniques disclosed in U.S. Pat. No. 7,106,447, which is hereby incorporated by reference.

The number of polygon facets 16*a* is not limited to the square that is illustrated. One skilled in the art will be able to determine the number of facets based on the rotation rate of the polygon mirror 16 and the pulse repetition rate of the laser. It is understood that there is no single optimal solution for the number of facets and the optimal performance. The fewer the number of facets there are, the faster the polygon mirror 16 needs to rotate to be sure not to miss a pulse. There is a practical limit as to how fast one can rotate a polygon before it will fly apart. Fewer facets allow one to design a smaller polygon, but at the higher rotation rates, there is increased friction due to wind resistance.

The minimum facet size is determined by the collimated beam diameter and the angle at which it strikes the polygon. More facets require a larger diameter, but for the same laser pulse rate, the motor speed is reduced.

Figure 4:
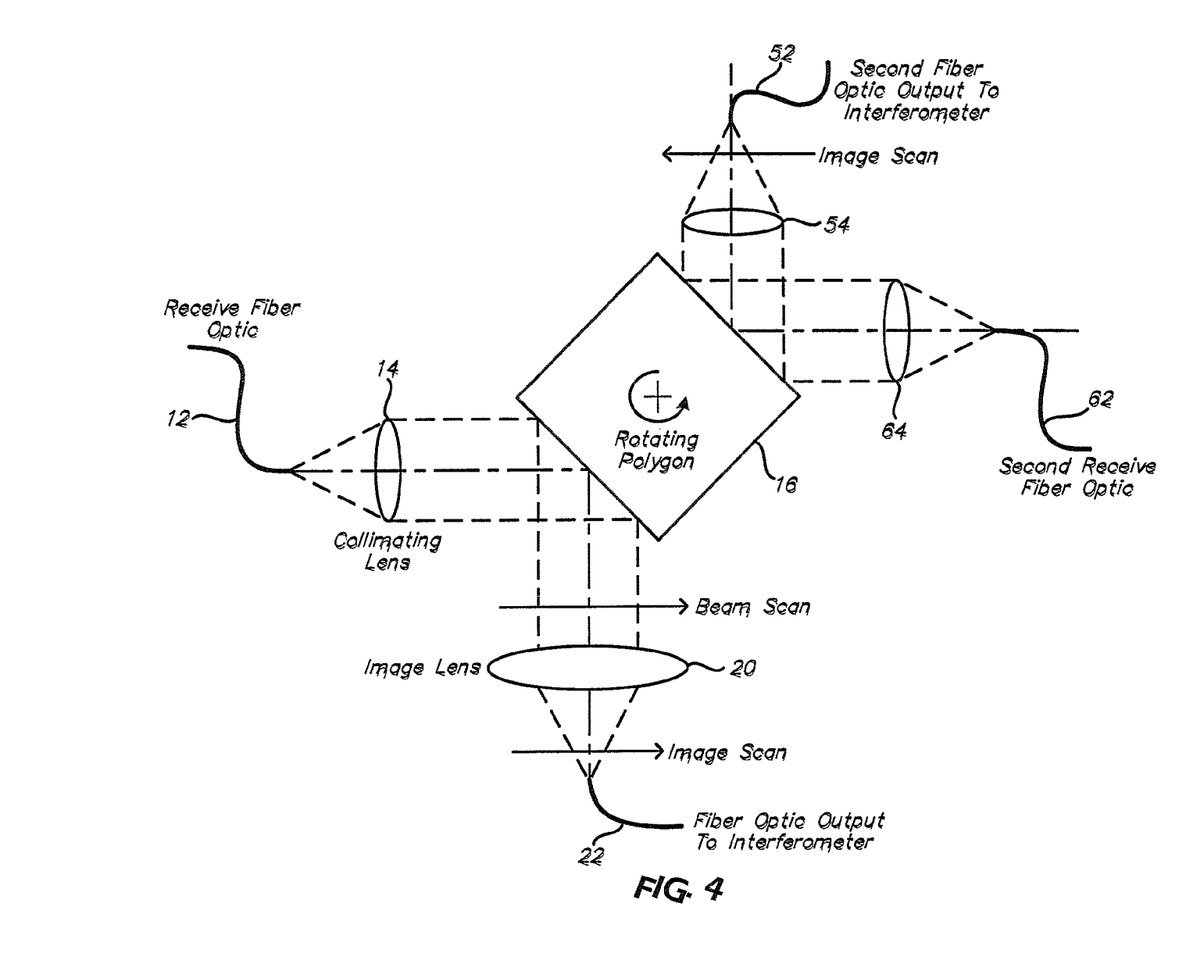
FIG. 4 is a schematic diagram illustrating a range gating system configuration according to a second embodiment of the present invention that utilizes a single spinning polygon with multiple laser beams and receivers positioned to illuminate different portions of the atmosphere.

A single spinning polygon could also support more than one receive fiber. In many cases, multiple laser beams and receivers are positioned to illuminate different portions of the atmosphere. Each laser beam would have their own receive fiber optic that could be arranged to be incident upon a different facet of the polygon which would allow additional receive channels to be gated with the same polygon as illustrated in FIG. 4. In particular, FIG. 4 shows an embodiment having multiple receive telescopes (not shown) looking at a single laser beam. In this configuration, the same polygon mirror 16 is used to simultaneously range gate signals from the two telescopes that are inputted via the first Receive Fiber Optic 12 and the second Receive Fiber Optic 52 into the Collimating Lenses 14, 54 respectively; and then scanned onto the Imaging Lenses 20,64 and to the first and second receive Fiber Optics 22,62 respectively.

Figure 5:
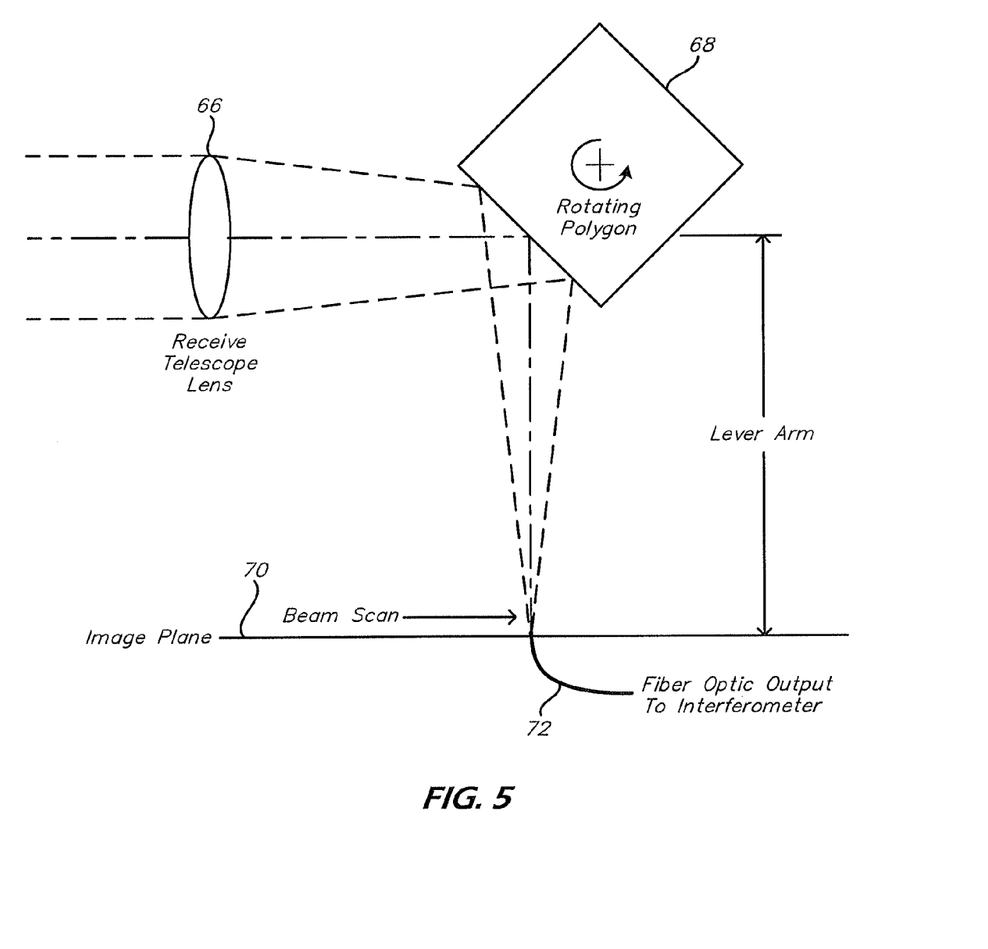
FIG. 5 is a schematic diagram illustrating a range gating system configuration according to a third embodiment of the present invention in which an input fiber optic is not required.

A variation to the implementation of FIG. 4 would be the elimination of the input fiber optic, as shown in FIG. 5. Depending upon the design, the Receive telescope Lens 66 could collimate the image plane of the receive telescope (not shown) directly into the scanning Rotating Polygon 68. As shown in FIG. 5, in one such implementation, the Rotating Polygon 68 is positioned in the converging beam of the Receive Telescope Lens 66. The beam is scanned across the receive telescope image plane 70 and the light is coupled directly to the Output Fiber Optic 72 that goes to the interferometer (not shown). The distance identified as the Lever Arm must be included in the dwell time calculations.

In this configuration, there is a tradeoff between the size of the Polygon Mirror 68 and the length of the Lever Arm. As the Polygon Mirror 68 is positioned closer to the Receive Lens 66, it must be larger, but for a particular focal length, the image dwell time across the Output Fiber Optic 72 will be shortened. Conversely, positioning the Polygon Mirror 68 closer to the image plane 70 will increase dwell time across the output fiber.

For example, consider a system where the scan rate is 5000 radians per second, the Lever Arm is 200 mm, the laser beam image is 0.2 mm in diameter, and the fiber diameter is 0.2 mm in diameter. The energy from the beam will start coupling into the fiber when the center of the image is 0.2 mm from the center of the output fiber, and will stop overlapping when the image center line is 0.2 mm on the other side of the fiber. The total travel will be 0.4 mm. The angle swept will be the travel divided by the Lever Arm or 0.4/200 or 2 mr. With a scan rate of 5000 radians per second, the dwell time will be $4 \times 1^{-7}$ seconds and that corresponds to a range gate of 60 meters. Increasing the Lever Arm will make the dwell time shorter and decreasing the Lever Arm will make the dwell time longer.

Figure 6A:
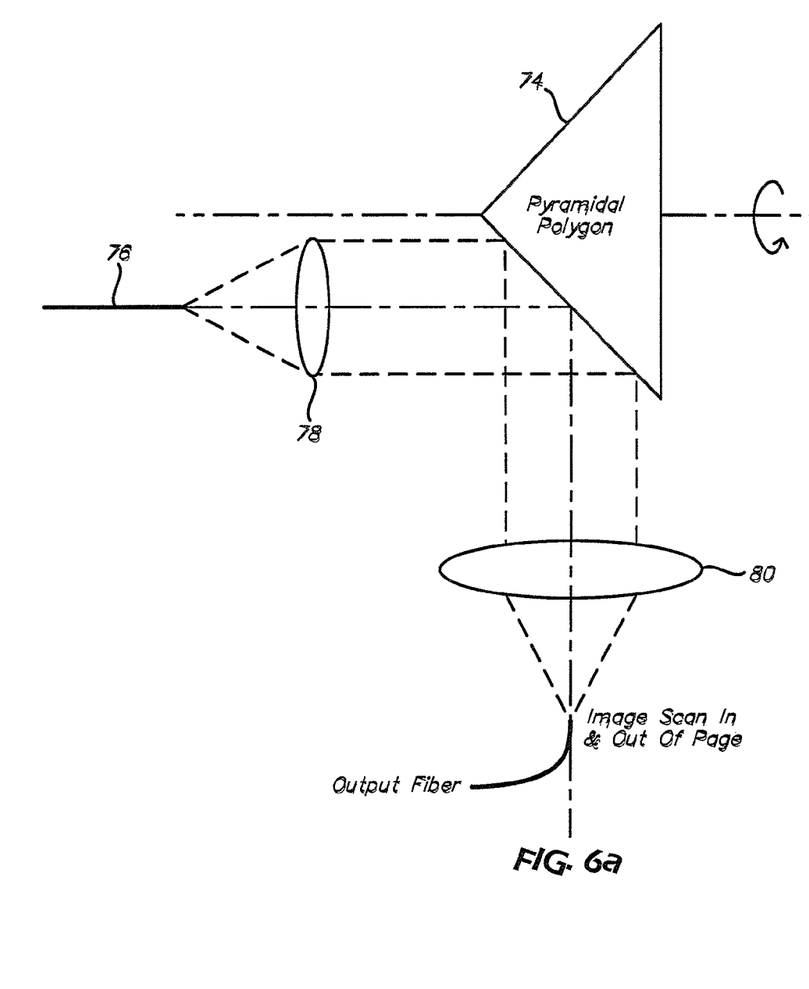
FIG. 6A is a schematic diagrams illustrating a range gating system configuration according to a fourth embodiment of the present invention that utilizes a pyramidal polygon.
Figure 6B:
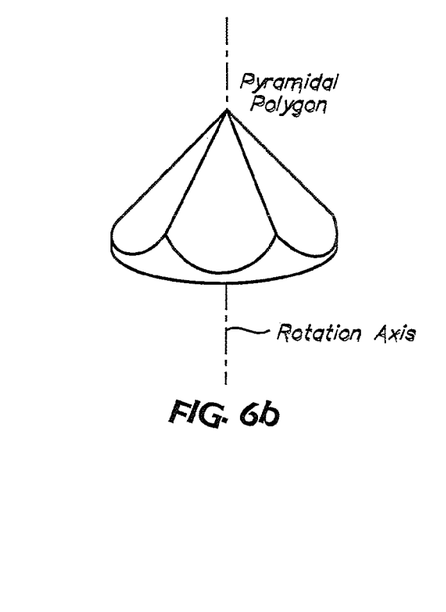
FIG. 6B is a perspective view of the pyramidal polygon of the fourth embodiment depicted in FIG. 6A.

Another variation or embodiment would be to use a pyramidal polygon 74 as illustrated in FIG. 6. The rotation axis of the pyramidal polygon 74 would be parallel to the optical axis defined by the Receive Fiber Optic 76 and the Collimating Lens 78. The rotation rate would have to double in the pyramidal polygon 74 configuration to address the different reflecting geometry. In this case, the rotation angle and the scanned angles are equal rather than doubled as in the previous embodiment.

For the low bandwidth detector explained hereinabove, this component may be implemented using, for example, a charge-coupled device (CCD) 114 as shown in FIG. 1, a Complementary Metal Oxide Silicon (CMOS) camera or other similar detecting devices that integrate over periods of a few seconds, have low thermal noise (less than one electron in the integration time), exhibit very low readout noise, can effectively record the spatial distribution of light generated by a Fabry Perot interferometer and have sensitivities that allow them to be used to count photons. In particular, in one image, low bandwidth detectors utilized in exemplary embodiments of the present invention may be implemented to capture the spatial intensity distribution of light from the Fabry Perot interferometer. By processing the spatial intensity distribution, one is able to extract all the atmospheric data products simultaneously.

In a conventional LIDAR system, the problem with detection devices such as a CCD is that CCDs "sees" energy for the integration or exposure time, and that time is usually fractions of a second or in some cases many seconds. Therefore one cannot use the exposure time to implement a range gate less than c/(2*exposure time) where an exposure time of 1 ms equates to a range gate of 150,000 meters. Exemplary embodiments of the present invention may be implemented to provide for range gates of only a few 10 s of meters.

Alternatively, a high bandwidth detector may be used where a micro-mirror array is used and the spatial intensity distribution is extracted with a photomultiplier tube (PMT) used as the high bandwidth detector. One of the tradeoffs that one must address with a system based on a micro-mirror array is that multiple masks must be implemented to obtain the individual data product measurements, and these measurements must be obtained sequentially. Therefore, the data products are not all measured simultaneously as one does with the low bandwidth detectors.

Figure 7:
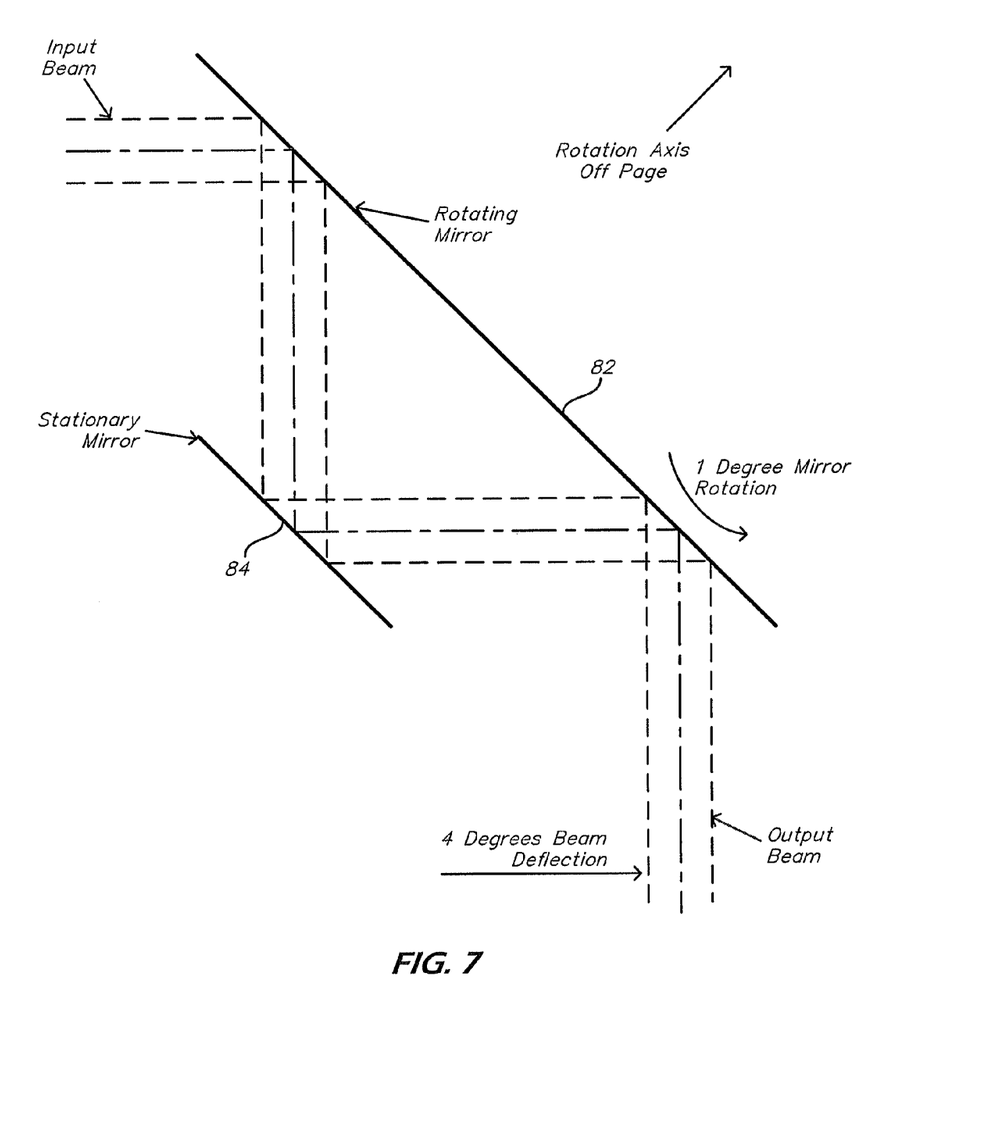
FIG. 7 is a schematic diagram illustrating a range gating system configuration according to a fifth embodiment of the present invention that achieves a quadrupling of the beam deflection.

In an even further embodiment of the invention, a quadrupling of the beam deflection angle is obtained by having large Rotating Polygon Mirror facets 82, and a small collimating Stationary Mirror 84, relative to each other, as shown in FIG. 7. If the Rotating Polygon Mirror 82 moves 1 degree, the output beam reflecting from the Stationary Mirror 84 rotates 4 degrees. Including additional bounces would allow one to multiply the gain even further.

Figure 8A:
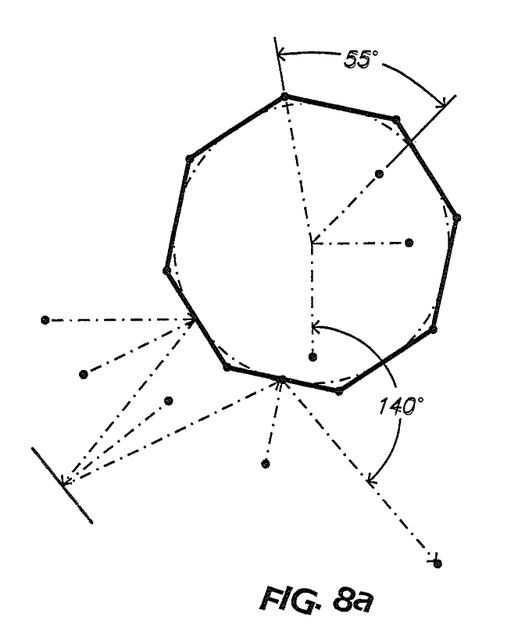
FIGS. 8A and 8B illustrate two examples for achieving angle multiplication in exemplary embodiments of the present invention.
Figure 8B:
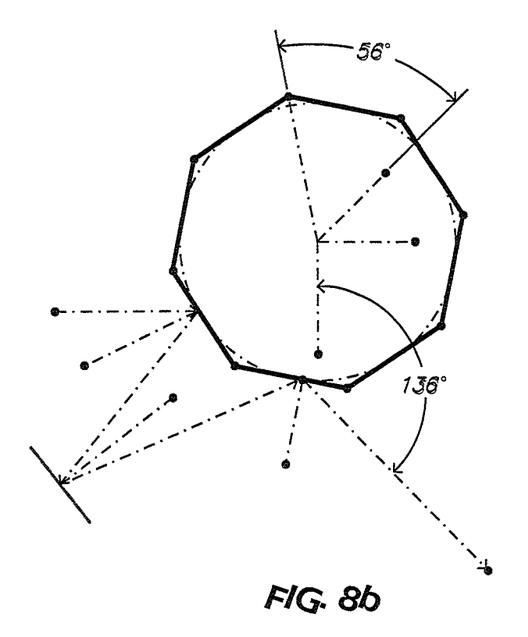

The two facets do not have to lie in the same plane for the angle multiplication to occur. Reflecting across the apex would also result in the angle multiplication as shown in FIGS. 8A and 8B. FIG. 8A shows the case where the apex is at 55 degrees from the reference, and the beam exits at 140 degrees. FIG. 8B shows the polygon rotated 1 degree, and the output beam is exiting at 136 degrees a change of 4 degrees. It should be noted that this process can be extended beyond the two reflections illustrated. It is however apparent that additional reflections would increase the beam's angular rate and therefore impact the dwell time which defines the range gate.

While the invention has been described with reference to exemplary embodiments, it should be understood that various changes, substitutions, and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications.

In addition, many modifications may be made to adapt a particular situation or material to the teachings of the invention without departing from the essential scope thereof. For example, one skilled in the art would recognize that, in exemplary embodiments, other scanning methods could be employed and that a scanner other a spinning polygon mirror may be utilized. For example, one could replace the rotating polygon with a spinning holographic disk or a nodding or oscillating mirror or mirrors. Such changes and modifications are to be understood as being included within the scope of the present invention as defined by the appended claims, unless they depart therefrom. Therefore, it is intended that the invention not be limited to any particular embodiment disclosed herein, but that the invention will include all embodiments falling within the scope of the appended claims.

We claim:

1. A system for scanning light to define a range gated signal, the system comprising:
    a pulsed coherent light source that directs light into the atmosphere;
    a light gathering instrument that receives the light modified by atmospheric backscatter and transfers the light onto an image plane;
    a scanner that scans collimated light formed by collimating the light from the image plane to form a range gated signal from the light modified by atmospheric backscatter received by light gathering instrument;
    a control circuit that coordinates timing of a scan rate of the scanner and a pulse rate of the pulsed coherent light source so that the range gated signal is formed according to a desired range gate;
    an optical device onto which an image of the range gated signal is scanned; and
    an interferometer to which the image of the range gated signal is directed by the optical device, the interferometer being configured to modify the image of the range gated signal according to a desired analysis to produce a modified image of the range gated signal.

2. The system according to claim 1, wherein the light transferred onto the image plane is collimated by a collimating lens that passes the collimated light to the scanner.

3. The system according to claim 2, further comprising an imaging lens across which the scanner scans the range gated signal to generate the image of the range gated signal that is scanned onto the optical device.

4. The system according to claim 1, wherein the light gathering instrument comprises a plurality of receive optical fibers having different diameter sizes to allow for the range gated signal to be scanned onto the optical device as a plurality of images of different ranges corresponding to each of the optical fibers concurrently during a single integration time period.

5. The system according to claim 1, wherein the scanner comprises a rotating mirror.

6. The system according to claim 5, wherein the rotating mirror is a spinning polygon mirror, and the control circuit sets the scan rate by controlling a speed at which the spinning polygon mirror spins.

7. The system according to claim 6, wherein the spinning polygon mirror comprises a plurality of polygon facets having a minimum size determined according to diameter of the collimated light and an angle at which the collimated light strikes the spinning polygon mirror.

8. The system according to claim 7, wherein the light gathering instrument comprises a plurality of receive fiber optics that each receive the light modified by atmospheric backscatter at a different respective area of the atmosphere and transfer the light for the respective area onto a respective image plane, and wherein collimated light formed by collimating the light from the respective image plane for each receive fiber optic is incident upon a respective facet of the spinning polygon mirror.

9. The system according to claim 7, wherein the optical device comprises a plurality of receive fiber optics, wherein the spinning polygon mirror scans the collimated light from the respective image plane for each receive fiber optic to form a respective range gated signal for the receive fiber optic, and wherein an image of the respective range gated signal for each receive fiber optic is scanned onto a respective receive fiber optic of the optical device and directed to the interferometer for respectively modifying according to the desired analysis.

10. A system for scanning light to define a range gated signal, the system comprising:
    a pulsed coherent light source that directs light into the atmosphere;
    a light gathering instrument that receives the light modified by atmospheric backscatter and transfers the light onto an image plane;
    a scanner that scans collimated light formed by converging the light from the image plane to form a range gated signal from the light modified by atmospheric backscatter received by light gathering instrument;
    a control circuit that coordinates timing of a scan rate of the scanner and a pulse rate of the pulsed coherent light source so that the range gated signal is formed according to a desired range gate;
    an optical device onto which an image of the range gated signal is scanned; and
    an interferometer to which the image of the range gated signal is directed by the optical device, the interferometer being configured to modify the image of the range gated signal according to a desired analysis to produce a modified image of the range gated signal.

11. The system according to claim 10, wherein the scanner scans the convergent light across the image plane directly to the optical device.

12. The system according to claim 11, wherein a distance between the scanner and the optical device is determined according to a size of the scanner.

13. The system according to claim 6, wherein the control circuit is configured to synchronize the pulse rate of the pulsed coherent light source with a rotation rate of the spinning polygon mirror according to the desired range gate.

14. The system according to claim 13, further comprising an incremental encoder that detects an index mark on a shaft of the spinning polygon mirror and outputs a pulse to the control circuit upon each detection of the spinning polygon mirror, wherein the control circuit determines a rotation rate of the spinning polygon mirror based on the pulses output by the incremental encoder.

15. The system according to claim 14, wherein the control circuit directs a scan driver to adjust the rotation rate of the spinning polygon mirror based on a desired rotation rate that corresponds to the desired range gate and a quantity of polygon facets of the spinning polygon mirror.

16. The system according to claim 15, wherein the control circuit divides a clock for setting the pulse rate of the pulsed coherent light source according to the desired rotation rate of the spinning polygon mirror and a desired quantity of laser pulses per rotation of the spinning polygon mirror and directs a scan driver to control the rotation rate of the spinning polygon mirror to match in phase with the pulse rate of the pulsed coherent light source.

17. The system according to claim 1, further comprising a detector configured to receive the modified image of the range gated signal from the interferometer, convert the modified image into an electrical signal, and analyze the electrical signal according to the desired analysis.

18. The system according to claim 17, wherein the desired analysis is an analysis of at least one atmospheric data product selected from velocity, temperature, aerosol to molecular ratio, and atmospheric density.

19. The system according to claim 17, wherein the interferometer is a Fabry Perot interferometer and the detector is a low-bandwidth detector.

20. The system according to claim 17, wherein the scanner comprises a micro-mirror array and the detector is a high-bandwidth detector.

21. The system according to claim 1, where the scanner comprises an oscillating mirror.

22. The system according to claim 5, wherein the rotating mirror comprises a pyramidal polygon mirror having a rotation axis that is parallel to an optical axis defined by the light gathering instrument.

23. The system according to claim 1, wherein the scanner comprises one or more rotating polygon mirror facets and one or more collimating stationary mirrors that are smaller than the rotating polygon mirror facets, and wherein the rotating polygon mirror facets and the collimating stationary mirrors are positioned relative to each other to increase a gain the light from the image plane.

24. A method for scanning light to define a range gated signal, the method comprising:
directing light from a pulsed coherent light source into the atmosphere;
receiving the light modified by atmospheric backscatter;
transferring the light modified by atmospheric backscatter onto an image plane;
collimating the light from the image plane to form collimated light;
scanning the collimated light to form a range gated signal from the light modified by atmospheric backscatter that is received;
coordinating timing of a scan rate of scanning the collimated light and a pulse rate of the pulsed coherent light source so that the range gated signal is formed according to a desired range gate;
scanning an image of the range gated signal onto an optical device that directs the image of the range gated signal to an interferometer; and
modifying the image of the range gated signal at the interferometer according to a desired analysis to produce a modified image of the range gated signal.

25. The method according to claim 24, further comprising scanning the range gated signal across an imaging lens to generate the image of the range gated signal that is scanned onto the optical device.

26. The method according to claim 24, wherein the light modified by atmospheric backscatter is received and transferred by a plurality of receive optical fibers having different diameter sizes, and wherein the image of the range gated signal is scanned onto the optical device as a plurality of images of different ranges corresponding to each of the optical fibers concurrently during a single integration time period.

27. The method according to claim 24, wherein a rotating mirror scans the collimated light to form the range gated signal.

28. The method according to claim 27, wherein the rotating mirror is a spinning polygon mirror, and a control circuit sets the scan rate by controlling a speed at which the spinning polygon mirror spins.

29. The method according to claim 28, wherein the spinning polygon mirror comprises a plurality of polygon facets having a minimum size determined according to diameter of the collimated light and an angle at which the collimated light strikes the spinning polygon mirror.

30. The method according to claim 29, wherein the light modified by atmospheric backscatter is received and transferred by a plurality of receive fiber optics that each receive the light modified by atmospheric backscatter at a different respective area of the atmosphere and transfer the light for the respective area onto a respective image plane, and wherein collimated light formed by collimating the light from the respective image plane for each receive fiber optic is incident upon a respective facet of the spinning polygon mirror.

31. The method according to claim 29, wherein the light modified by atmospheric backscatter is received and transferred by a plurality of receive fiber optics, wherein the spinning polygon mirror scans the collimated light from the respective image plane for each receive fiber optic to form a respective range gated signal for the receive fiber optic, and wherein an image of the respective range gated signal for each receive fiber optic is scanned onto a respective receive fiber optic of the optical device and directed to the interferometer for respectively modifying according to the desired analysis.

32. A method for scanning light to define a range gated signal, the method comprising:
directing light from a pulsed coherent light source into the atmosphere;
receiving the light modified by atmospheric backscatter;
transferring the light modified by atmospheric backscatter onto an image plane;
converging the light from the image plane to form convergent light;
scanning the convergent light to form a range gated signal from the light modified by atmospheric backscatter that is received;
coordinating timing of a scan rate of scanning the convergent light and a pulse rate of the pulsed coherent light source so that the range gated signal is formed according to a desired range gate;
scanning an image of the range gated signal onto an optical device that directs the image of the range gated signal to an interferometer; and
modifying the image of the range gated signal at the interferometer according to a desired analysis to produce a modified image of the range gated signal.

33. The method according to claim 32, wherein the convergent light is scanned across the image plane directly to the optical device.

34. The method according to claim 28, wherein coordinating timing of the scan rate and the pulse rate comprises synchronizes the pulse rate of the pulsed coherent light source with a rotation rate of the spinning polygon mirror according to the desired range gate.

35. The method according to claim 34, further comprising determining a rotation rate of the spinning polygon mirror and adjusting the rotation rate based on a desired rotation rate that corresponds to the desired range gate and a quantity of polygon facets of the spinning polygon mirror.

36. The method according to claim 35, further comprising dividing a clock for setting the pulse rate of the pulsed coherent light source according to the desired rotation rate of the spinning polygon mirror and a desired quantity of laser pulses per rotation of the spinning polygon mirror and controlling the rotation rate of the spinning polygon mirror to match in phase with the pulse rate of the pulsed coherent light source.

37. The method according to claim 24, further comprising passing the modified image of the range gated signal from the interferometer to a detector that converts the modified image into an electrical signal and processing the electrical signal at the detector to perform the desired analysis.

38. The method according to claim 37, wherein the desired analysis is an analysis of at least one atmospheric data product selected from velocity, temperature, aerosol to molecular ratio, and atmospheric density.

* * * * *